United States Patent [19]
Hama et al.

[11] Patent Number: 5,135,691
[45] Date of Patent: Aug. 4, 1992

[54] LOW TEMPERATURE SINTERING OF CERAMIC MATERIALS

[75] Inventors: Masaaki Hama; Daniel M. Dabbs; Ilhan A. Aksay, all of Seattle, Wash.

[73] Assignee: The Washington Technology Centre, Seattle, Wash.

[21] Appl. No.: 109,485

[22] Filed: Oct. 16, 1987

[51] Int. Cl.$^5$ ............................................. C04B 41/81
[52] U.S. Cl. ........................................ 264/60; 264/62; 264/63
[58] Field of Search ................ 264/62, 63, 60; 501/12

[56] References Cited

U.S. PATENT DOCUMENTS 3,485,904 10/1969 Ostrowski et al.
3,780,150 12/1973 Stetson et al.
3,789,096 1/1974 Church .................................. 264/62
3,808,015 2/1974 Seufert.
3,880,971 5/1975 Pantanelli.
4,289,720 9/1981 Yajima et al.
4,353,958 10/1982 Kita et al.
4,369,154 1/1983 Doughtery.
4,495,121 1/1985 Horikiri et al.

OTHER PUBLICATIONS

Ceramic Bulletin, vol. 64, No. 12 (1985) pp. 1597–1602.
Presentation: American Ceramic Society 39th Pacific Coast Regional Meeting 1986, Seattle, Wash.

Primary Examiner—James Derrington
Attorney, Agent, or Firm—Christensen, O'Connor, Johnson & Kindness

[57] ABSTRACT

Ultra smooth ceramic materials are prepared by the low temperature sintering of a ceramic body that has been infiltrated prior to sintering with an inorganic polymer. The infiltration allows for a decrease in the sintering temperature which translates into a smoother, stronger ceramic material.

32 Claims, 2 Drawing Sheets

LOW TEMPERATURE SINTERING OF CERAMIC MATERIALS

BACKGROUND OF THE INVENTION

The present invention relates to a process for the low temperature sintering of ceramic materials that have been infiltrated by an inorganic polymer. The process provides ultra smooth ceramic materials useful in the electronics industry.

As integrated circuit technology has developed over the past several decades, certain materials have been preferred in the production of substrates for mounting or carrying the semiconductor chips in which complex, densely packed circuitry is embedded. In particular, because of their exceptional insulating properties, ceramics and glass ceramics have become the most preferred materials for the substrates. However, in order to serve the purposes described, the substrates constituting this material are required to have a high degree of flatness, and also to posses a high quality smooth surface.

The surface roughness of substrates to be used in the electronics industry is typically measured by the centerline average roughness (CLA). The CLA is directly proportional to the diameter of the grains that make up the sintered body of a ceramic material. AS the diameter of the grain size increases so does the surface roughness of the ceramic substrate. The grain size of the ceramic material is primarily determined by two factors, first the size of the ceramic particles, and second, the temperature at which the ceramic material is sintered.

One method of trying to decrease the surface roughness of the ceramic material is to use smaller sized ceramic particles. The use of the smaller ceramic particles results in the sintered material grain size being smaller compared to when larger ceramic particles are used. However, the problem that is encountered by using the smaller size ceramic particles involves the difficulty in handling such particles. The small particles are essentially a powder that is difficult to disperse and form into a green compact of ceramic material prior to sintering.

The grain size of the sintered ceramic material is also determined by the temperature that the sintering occurs. As the temperature that the sintering occurs increases, the grain growth is promoted. Therefore, it would be desirable to decrease the temperature that the sintering is carried out. The problem with this approach is that the minimum sintering temperature is determined by the size of the voids present in the green compact of ceramic material. In order to decease the minimum sintering temperature, it is necessary to decrease the size of the voids in the green compact of ceramic material. This reduction in the size of the voids may be achieved by using smaller sized ceramic particles, however, this again suffers from the drawback discussed above with regard to small size particles.

U.S. Pat. No. 4,369,154 to Dougherty relates to a method for preparing smooth ceramic substrates useful in the electronics industry. Such substrates are prepared from ceramic compacts comprising alumina or glass ceramic, an organic bonding agent, a plasticizing agent, an emulsifying agent, a glass frit and a solvent. The composition is consolidated and formed into a compact that is lapped prior to the sintering step at conventional temperatures.

Therefore, it is an object of the present invention to provide an efficient method for preparing ultra smooth surface ceramic materials that may be used in the electronics industry.

It is another object of the present invention to provide a method of preparing such ultra smooth ceramic materials by using a low temperature sintering process.

SUMMARY OF THE INVENTION

The present invention is a process for producing sintered ceramic material. The process includes the steps of first, forming a consolidated body of ceramic material. This consolidated body is then infiltrated with an inorganic polymer represent by the formula:

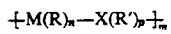

$$+M(R)_n-X(R')_p+_m$$

wherein M at each occurence is the same or a different trivalent or tetravalent inorganic ion; when M is trivalent, n=1; when M is tetravalent, n=2; X is selected from the group consisting of $O^{-2}$, $S^{-2}$, and $N^{-3}$; when X is $O^{-2}$ or $S^{-2}$, p=0; when X is $N^{-3}$, p=1; R and R' at each separate occurrence may be an alkyl, alkoxy, acyloxy, phenyl, or phenoxy group containing a chain of at least three carbon atoms; m may range from about 5 to about 1000, preferably from bout 10 to about 200. The infiltrated consolidated body is then sintered to provide the product ceramic material.

In a preferred embodiment, the present invention is a process for producing a sintered ceramic material wherein the consolidated body is formed from an alumina ceramic material and infiltrated with a polyaluminoxane. The infiltrated consolidated body is then subjected to sintering conditions.

By the practice of the present invention, it is possible to prepare ceramic materials with ultra smooth surfaces by using low sintering temperatures and an inorganic polymer.

BRIEF DESCRIPTION OF THE DRAWINGS

The present invention will become more apparent from the following description herein when considered with the accompanying drawings. Such drawings are set forth as being merely illustrative of the invention and are not intended in any way to be limitative thereof, wherein.

DETAILED DESCRIPTION OF THE INVENTION

Figure 1:
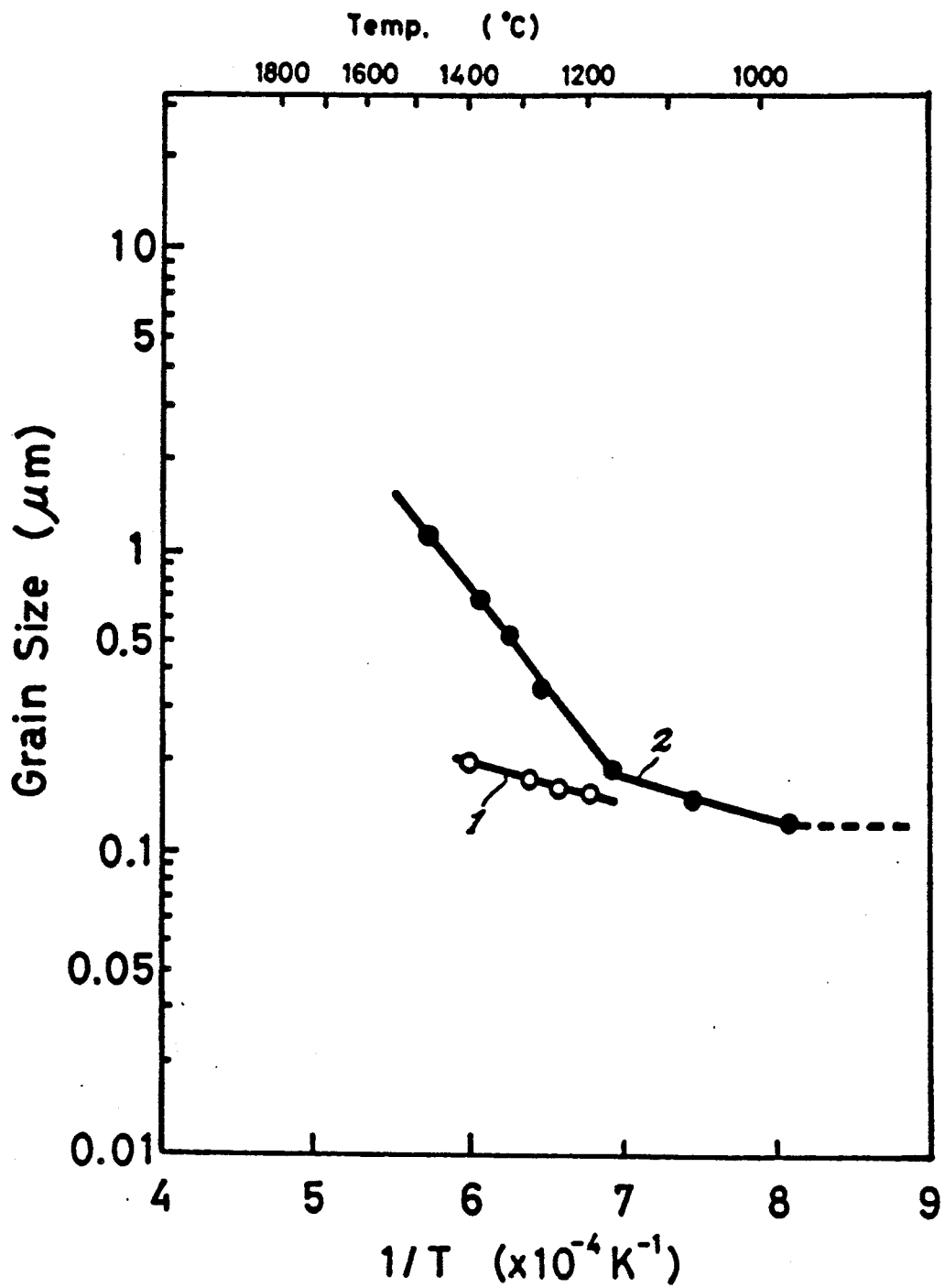
FIG. 1 illustrates the relationship between grain size of the ceramic material to the sintering temperature; and, FIG. 2 illustrates the relationship between density of the ceramic material to sintering temperature.

The ceramic substrates useful in the practice of the present invention include the known oxides, carbides, nitrides, borides, silicides, and the like, and composite compounds thereof. Preferred ceramic substrates useful in the present invention include ceramic powders of $Al_2O_3$, $ZrO_2$, $Si_3N_4$, SiC and perovskite structure ceramics such as, $BaTiO_3$. It is also possible to use ceramic fibers prepared from $Al_2O_3$, SiC, $Si_3N_4$, $B_4C$, and mixture thereof. Ceramic platelets are also useful such as those prepared from $TiO_2$, $B_4C$, AlOOH and ceramic clays. It is possible that the ceramic powders, ceramic fibers and ceramic platelets may be combined to form the ceramic substrates.

When choosing the particular ceramic substrates to be used, it desirable to employ ceramic materials that exhibit a grain size that is small enough to provide the desired surface smoothness, yet large enough to allow for the efficient handling of the grains of ceramic substrates. The particle grain size of the ceramic particle may range from about 0.05 microns to about 2.0 microns, preferably about 0.1 microns to about 1.0 microns, most preferably about 0.2 to about 0.5 microns. The choice of a particular ceramic particle with particle grain sizes ranging within the above ranges insures that the grain size of the sintered ceramic material will be relatively small, ranging from about 0.05 microns to about 5.0 microns, preferably about 0.05 to about 3 microns and most preferably 0.05 microns to about 1 micron.

It is possible and sometimes desirable to add other additives of differing properties to the ceramic substrates, such as pigments, sintering agents and toughening agent, as well as other additives conventionally known in the art.

From the ceramic substrates are prepared the consolidated bodies of homogeneous ceramic mass that will be infiltrated with the inorganic polymer in accordance with the present invention. The consolidated body of ceramic material prior to sintering is a green compact of ceramic material. Preferably, the green compact exhibits a density ranging from about 55 volume percent up to a density wherein the voids of the green compact remain open to the outside of the green compact. It the voids become isolated from the outside of the green compact, the inorganic polymer will not infiltrate the green compact. Most preferably, the density of the green compact ranges from about 55 volume percent to about 85 volume percent. The term "density" as used herein refers to the ratio of bulk density to the theoretical density. The theoretical density is based on the crystalline structure of the ceramic material and is readily available from standard references.

The green compact of ceramic materials may be prepared by forming a suspension of the ceramic material in water. The amount of ceramic material in the suspension is dependent upon the efficiency of the formation of the green compact. If too little ceramic material is in suspension undesirably long periods of time will be necessary to consolidate the ceramic material. If too much ceramic material is in suspension the suspension will become too viscous to mix and handle. Preferably, the ceramic material is present in the suspension in an amount ranging from about 10 volume percent to about 60 volume percent, most preferably about 20 to about 50 volume percent. The suspension of ceramic material may be achieved by adjusting the zeta potential of the ceramic powder to a value ranging from less than about $-40$ mV to greater than about 40 mV. The zeta potential of the ceramic powder may be adjusted by adjusting the pH of the solution or by adding an organic dispersant to coat the ceramic particles.

The aqueous suspension of ceramic material is consolidated to form the green compact. The consolidated green compact is formed by convention means such as sedimenting, pressing, centrifugation, extrusion, injection molding, or tape casting of the aqueous or non-aqueous suspension of ceramic materials. Water is removed from the consolidated compact by conventional means such as heating and vacuum drying.

Where the organic dispersnat has been used to aid in the suspension of the ceramic powder in water, it may be advantageous to partially sinter the consolidated compact at a temperature that provides a partially sintered compact of required density ranging from about 55 to about 85 volume percent. Preferably, the temperature ranges from about 900° C. to about 1300° C., most preferably about 900° C. to about 1000°C. The temperature is chosen so that the organic dispersant is removed from the consolidated compact. The partial sintering at these temperatures also serves to impart a degree of structural integrity to the consolidated compact that is necessary in order to allow for the infiltration of the consolidated compact. After this partial sintering the consolidated compact exhibits a desirable degree of structural integrity and a density generally only 1 or 2 percent greater than the density of the unsintered compact, preferably ranging from bout 55 to about 85 volume percent. However, where the organic coating agent is not employed and the consolidated compact, after being dried, exhibits a degree of structural integrity, it may not be necessary to partially sinter the consolidated compact prior to infiltration. The desirable level of structural integrity is evidenced by a lack of ceramic particle loss from the consolidated compact during infiltration.

In order to promote the infiltration of the voids contained within the consolidated compact it is desirable, though not required, to evacuate the consolidated compact prior to the infiltration step. The evacuation results in a removal of gases that may occupy the voids, therefore allowing the inorganic polymer to easily infiltrate the voids of the consolidated ceramic compact. One method of evacuating the consolidated compact is to place the consolidated compact under vacuum conditions for a period of time ranging from about 10 minutes to about 1 hour. After the evacuation step, the consolidated compact must be prepared for the infiltration of the inorganic polymer. It is desirable to heat the consolidated compact to a temperature ranging from about 40° C. to about 80° C. under a partial vacuum prior to the infiltration step. Preferably, the consolidated compact is heated to a temperature ranging from about 50° C. to about 70° C. It is preferred to heat the consolidated compact to the elevated temperature prior to infiltration in order to promote the infiltration of the voids in the consolidated compact by the inorganic polymer solution. The increased temperature of the consolidated compact serves to maintain the viscosity of the inorganic polymer at a level that allows the polymer to easily infiltrate the consolidated compact.

The inorganic polymer that is used to infiltrate the consolidated compact of ceramic material may be represented by the formula:

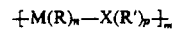

$$\pm M(R)_m - X(R')_p \pm$$

wherein M at each occurrence is the same or a different trivalent or a tetravalent inorganic ion. When M is trivalent, n=1; when M is tetravalent, n=2. X is selected from the group consisting of $O^{-2}$, $S^{-2}$, and $N^{-3}$; when X is $O^{-2}$ or $S^{-2}$, p=0; when X is $N^{-3}$, p=1; R and R' at each separate occurrence may be an alkyl, alkoxy, acyloxy, phenyl, or phenoxy group containing a chain of at least three carbon atoms; m may range from about 5 to about 1000, preferably from about 10 to about 200. Preferably, M is selected from the group consisting of inorganic ions such as aluminum, yttrium, silicon, titanium, copper, actinide and lanthanide ions. Most preferably, the inorganic polymer is a polyaluminoxane wherein X is $O^{31\ 2}$ and M is aluminum. Preferably, R and R' are selected from the organic groups i-$C_3H_7O$—; n-$C_5H_{12}OO$—; or n-$C_{17}H_{35}OO$—. It is possible that the pendent R and R' groups may be substituted with hydroxyl groups in an amount that does not adversely effect the solubility of the inorganic polymer in an organic solvent.

Organic solvents that are useful in the practice of the present invention include those that maintain the inorganic polymer in solution over the temperature ranges and concentrations employed in the present invention. Preferably, the organic solvents include tetrahydrofuran, dimethyl sulfoxide, chloroform, ethyl ether, acetone, benzene and the like.

It is possible that the inorganic polymer used to infiltrate the consolidated compact of ceramic material may also be cross-linked according to the formula:

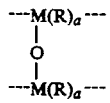

wherein M at each occurrence is the same or a different trivalent or a tetravalent inorganic ion; when M is trivalent, $a=1$; when M is tetravalent, $a=2$; R at each separate occurrence may be an alkyl, alkoxy, acyloxy, phenyl or phenoxy group containing a chain of three or more carbon atoms. The oxygen bridges serve to increase the viscosity of the inorganic polymer in solution, therefore, to promote infiltration it is desirable to have less than about 75 percent cross-linking present.

It is possible to sue mixture of the inorganic polymers to infiltrate the consolidated compact in order to impart varying properties to the sintered ceramic material to be produced by the present process.

The inorganic polymer is placed in solution prior to infiltrating the consolidated compact of ceramic material. The amount of inorganic polymer that is in solution is dependent upon the degree that one desires to increase the density of the consolidated compact and the viscosity of the inorganic polymer solution. The inorganic polymer must be used in amounts that result in a change in the density of the ceramic body, however, the amount of inorganic polymer must not be so great that the viscosity of the inorganic polymer solution inhibits infiltration. Preferably, the inorganic polymer is present in an amount ranging from about 40 percent by weight to about 80 percent by weight in the organic solvent. Most preferably, the inorganic polymer is present in an amount ranging from about 50 to about 70 percent by weight.

The solution of inorganic polymer is prepared and heated to a temperature corresponding to the temperature that the consolidated compact is heated. The temperature is chosen so the viscosity of the solution of inorganic polymer is low enough to promote efficient infiltration of the consolidated body. This temperature may range from about 40° C. to about 80° C., preferably from about 50° C. to 70° C., and most preferably is about 60° C. The consolidated compact and the inorganic polymer solution may be contacted in any manner that allows the inorganic polymer solution to infiltrate the voids of the consolidated compact. An example of such method places the inorganic polymer solution on top of the consolidated compact in the vessel in which the consolidated compact was prepared. The consolidated compact is held under the solution for a period of time sufficient to allow the inorganic polymer to infiltrate substantially all of the voids of the consolidated compact. Preferably, the consolidated compact is held under the inorganic polymer solution for a period of time ranging from about 15 minutes to about 1 hour. The point that the infiltration is complete is generally characterized by the point at which the weight of the infiltrated compact approaches the theoretical weight of a completely infiltrated open pore compact.

It may be desirable to infiltrate the consolidated compact under partial vacuum. This is advantageous because air inclusions within the voids of the consolidated compact that may inhibit infiltration are removed. After the infiltration step has been completed, the infiltrated compact is dried by conventional means such as the application of heat or vacuum drying and any remaining excess crystallized polymer is removed from the surface of the infiltrated compact. The crystallized polymers may be removed from the surface of the consolidated compact by brushing or polishing.

The infiltrated compact is then heated to a temperature sufficient to burn off the absorbed organic solvent and the functional groups of the inorganic polymer, thus leaving only the inorganic polymer backbone in the voids of the consolidated compact. The absorbed solvent and functional groups are burned off by holding the infiltrated compact at a temperature ranging from about 500° C. to about 700° C. for a period of time ranging from about 0.5 to about 1 hours. Preferably, the infiltrated compact is held at a temperature of about 600° C. for a period of time of about 1 hours. The infiltrated compact exhibits a density after infiltration that is at least about 1 volume percent greater than the density of the green compact, preferably the density is at least about 50 volume percent, and most preferably at least about 70 volume percent.

The sintering step may be carried out by conventional ceramic sintering processes. For example, when the inorganic polymer is an aluminoxane and the ceramic material is alumina, the infiltrated compact may be sintered at a temperature ranging up to about 1400° C. for a period of time ranging from about 0.5 hours to 2 hours. Preferably, the infiltrated compact is sintered at a temperature ranging from about 1000° C. to about 1400° C. for a period of time of about 1 hour, most preferably, the infiltrated compact is sintered at a temperature ranging from about 1200° C. to about 1300° C.

It has been found that the sintered infiltrated compact may be reinfiltrated several times to improve the amount of inorganic polymer present in the voids of the ceramic material. The infiltrated compact that has had the adsorbed solvent and functional groups burned off may be partially sintered at a temperature ranging from about 1000° C. to about 1200° C. for a period of time ranging from about 0.5 hours to 2 hours. The partially sintered ceramic compact may then be infiltrated again as discussed above and sintered again in the same temperature range for the same period of time. Finally, the twice sintered sample may be infiltrated again as discussed above and sintered at the final sintering temperature of about 1400° C. for about 1 hours. The point that the final sintering is complete is evidenced by an approach to the theoretical density of the ceramic material, preferably the sintering results in a final product that has a density that is about 90 to 99.99 percent of the theoretical density, preferably about 97 to about 99.99 percent of the theoretical density.

The sintering temperatures that are employed in the present invention are generally lower than those practiced by conventional methods of preparing ceramic materials. The lower sintering temperatures result in a smaller amount of grain growth in the ceramic compact that ultimately results in the formation of a smoother surface of the sintered compact. The smoother surface is evidenced by a smaller centerline average roughness (CLA) value for a given ceramic material. It is believed that it is possible to use a lower sintering temperature in the practice of the present invention because the preferred sintering temperature is dependent upon the size of the voids and the density of the green compact. By the practice of the infiltration step in accordance with the present invention, it is possible to decrease the number and size of the voids in the green compact and therefore increase the density oft he green compact prior to sintering; accordingly, the sintering temperature may be reduced. The reduced sintering temperature therefore allows for the production of ultra smooth ceramic materials that are useful in the electronics industry, as well as other application.

The sintered ceramic material as prepared in accordance with the present invention exhibit a centerline average roughness (CLA) less than about 0.05 microns, preferably less than about 0.01 microns and most preferably less than about 0.006 microns, thus indicating a very smooth surface. The grain size of the sintered ceramic material as prepared in accordance with the present invention ranges from about 0.2 microns to about 0.5 microns. This translates into an increased strength of the ceramic body due to the small grains and elimination of any substantial grain growth. The low sintering temperature also results in a more uniform microstructure and the elimination of large voids that have a detrimental effect on the mechanical reliability of the ceramic materials.

Also, high temperature creep is know to be a function of the grain growth rate. Since the process of the present invention is capable of minimizing the gain growth rate, it is believed that an improvement in the high temperature creep resistance can be expected from this inorganic polymer process. An improvement in the high temperature creep resistance allows increased operational temperature ranges for devices prepared from the ceramic material.

Certain electrical properties may be enhanced by the practice of the present invention. The manufacturing process for producing temperature compensation capacitors and high dielectric constant capacitors could be controlled with greater efficiency through the use of the inorganic polymer process of the present invention. Conventional processes result in a second phase agglomeration and segregation and require the addition of excess ceramic material. The uniform distribution achieved with the use of the inorganic polymers in the present invention would reduce the second phase agglomeration and segregation problems.

It is believed that ceramic particles coated with inorganic polymers containing specific metal ions could be used to raise the nonlinear resistance properties of electrical ceramics. Also, the depth to which the inorganic polymer infiltrates the green ceramic compact may be controlled by varying the viscosity of the inorganic polymer. High strength, lightweight ceramics can be fabricated by producing a dense region at the surface of the ceramic material. Thus, high strength bone-like ceramic products can be made by infiltrating only the surface of a porous ceramic body.

In applications where thin films of ceramic materials are prepared by chemical vapor deposition and high temperature melt epitaxial growth, the use of inorganic polymers to produce the thin films may allow easy control of the composition by varying the polymer structure and easy control of the thickness of the film by varying the polymer viscosity. The control of the composition and thickness of the thin film has been a problem with conventional processes. Such thin films of ceramic material are useful as multilayer capacitors that require thin film layers of different composition. Also, the inorganic polymers can be used to produce thin films useful as alternating dielectric or insulating layers for integrated circuits.

Another method for preparing the consolidated body of ceramic material containing a polyaluminoxane may be achieved by forming a consolidated body of a ceramic material and a polyaluminoxane. The thus formed consolidated body may then be sintered, as discussed above, to form the sintered ceramic material in accordance with the present invention. The use of this chemical mixing technique would allow for the production of ceramic materials containing a more uniform distribution of additives such as metal ions. These metal ions could be introduced into the ceramic material by chemically incorporating them into the polyaluminoxane rather than physically mixing them into the ceramic material prior to consolidation.

The following examples are presented to illustrate the present invention and are not intended to limit the scope in any way.

EXAMPLE

A consolidated compact of alumina is formed from an alumina powder exhibiting a particle size of about 0.2 microns, available from Sumitomo Chemical Co., Ltd., under the designation AKP-50, as follows: a 20 volume percent suspension of alumina powder in water is formed by dispersing the alumina powder in a glass vessel. The dispersion is aided by adjusting the pH of the suspension to 2.5. The suspension is slip case into a plaster mold. The compact is then dried by removing the water by heat. The compact is then partially sintered at 900° C. to impart structural integrity tot he compact. After partially sintering the compact, it is placed under a vacuum and evacuated for about 0.5 hours. The compact is then heated to 60° C. under a partial vacuum by use of an oil bath.

A 60 weight percent polyaluminoxane solution is prepared in tetrahydrofuran, and is heated to 60° C. outside of the compact container. The polyaluminoxane is represented by the formula:

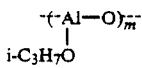

wherein m=200.

The polyaluminoxane solution is then added to the compact container and the compact is held at 60° C. under the solution for about 15 minutes. The sample is then dried in air and excess crystallized polymer is removed from the surface of the ceramic compact by brushing. The infiltrated sample is then heated and held at a temperature of 600° C. for 1 hour in order to burn off the functional groups of the polyaluminoxane and to burn off any absorbed solvent. The sample is then partially sintered at 1100° C. for 1 hours, re-infiltrated with the polyaluminoxane solution in the same manner as discussed above, and sintered again at 1100° C. for 1 hour, then finally reinfiltrated again and sintered at the final temperature of about 1400° C. for about 1 hour.

The recovered product is a sintered ceramic material with small grain size and smooth surfaces. The grain size of the ceramic material is represented in FIG. 1 as a function of the temperature at which the infiltrated ceramic material is sintered. As can be seen from FIG. 1, the ceramic material that has not been infiltrated 2 with the polyaluminoxane exhibits a larger grain size for a given sintering temperature. Further, the degree of grain growth is much larger with the ceramic material that has not been infiltrated 2 when compared to the ceramic material that has been infiltrated 1 as indicated by the sharp rise of the grain size with increasing temperature of the sintered ceramic material that has not been infiltrated 2.

Figure 2:
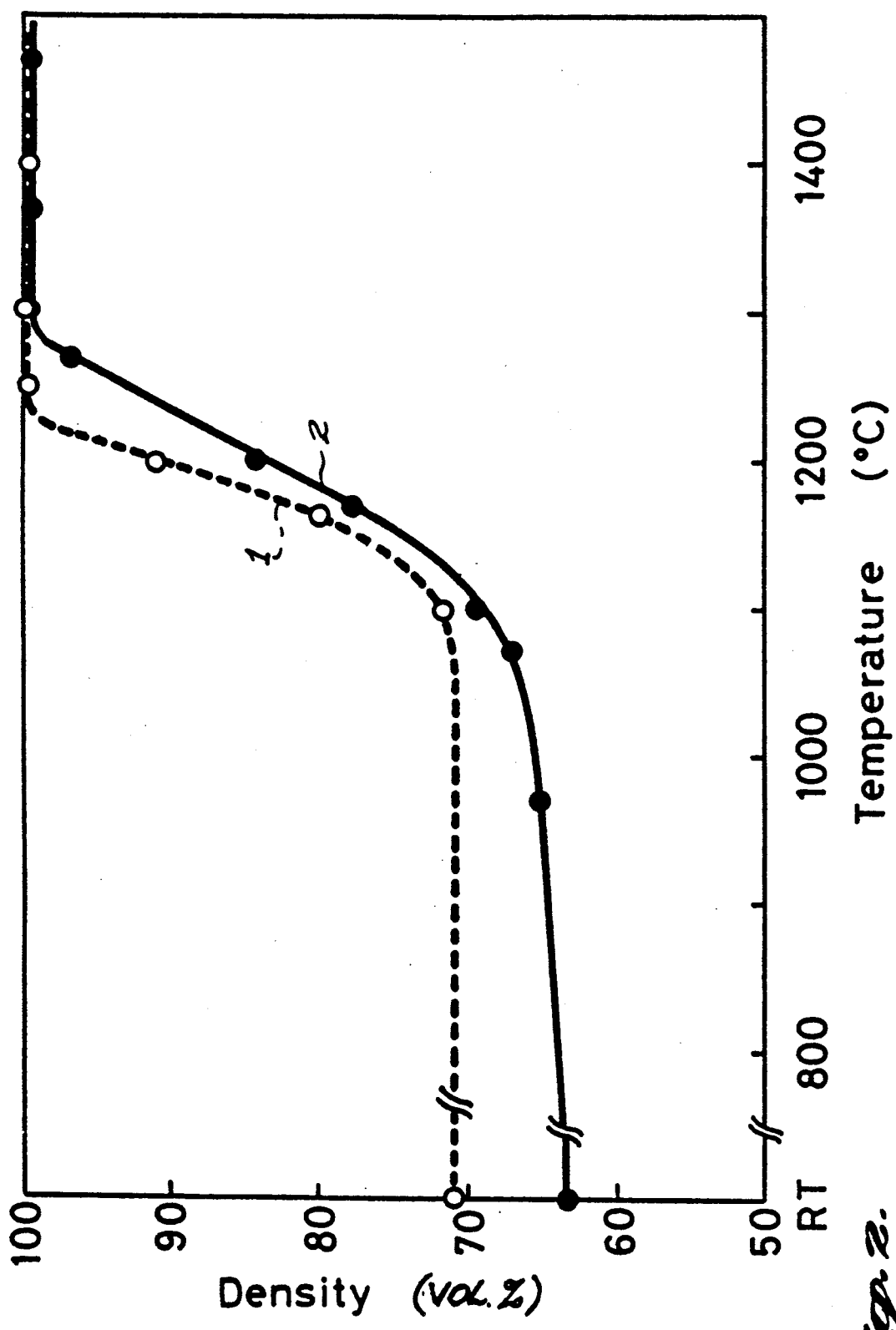

In FIG. 2, the increase in the density of the infiltrated compact 1 compared to a compact that has not been infiltrated 2 is illustrated by the intersection of the curves with the y-axis. Also, FIG. 2 illustrates that near theoretical density (100%) is achieved at a lower temperature when the ceramic compact is infiltrated 1 with an inorganic polymer, compared to the temperature required for a ceramic compact that has not been infiltrated 2.

It is to be understood that modifications and changes to the preferred embodiment of the present invention described herein and shown above may be made without departing form the spirit and scope of the invention.

The embodiments of the invention in which an exclusive property or privilege is claimed are defined as follows:

1. A process for producing sintered ceramic materials comprising the steps of:
   (a) forming a consolidated body of ceramic material;
   (b) infiltrating the consolidated body with an inorganic polymer represented by the formula:

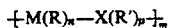

wherein M at each occurrence is the same or a different trivalent to tetravalent inorganic ion; when M is trivalent, n=1; when M is tetravalent, n=2; X is selected from the group consisting of $O^{-2}$, $S^{-2}$, and $N^{-3}$; when X is $O^{-2}$ or $S^{-2}$, p=0; when X is $N^{-3}$, p=1; R and R' at each separate occurrence may be an alkyl, alkoxy, acyloxy, phenyl, or phenoxy group containing a chain of at least three carbon atoms; m may range from about 5 to about 1,000;
   (c) sintering the infiltrated ceramic body.

2. The process of claim 1, wherein after forming the consolidated body in step (a), but prior to infiltrating the consolidated body in step (b), the consolidated body is evacuated by subjecting the consolidated body to conditions effective for removing gases from the voids of the consolidated ceramic body.

3. The process of claim 2, wherein the consolidated body of ceramic material of step (a) is partially sintered under conditions effective to impart physical stability to the consolidated body.

4. The process of claim 1, wherein the consolidated body of ceramic material comprises a green compact of ceramic powder, ceramic platelets, ceramic fibers or mixtures thereof.

5. The process of claim 4, wherein the composition of the ceramic powder is selected from the group consisting of $Al_2O_3$, $ZrO_2$, $Si_3N_4$, SiC, and perovskite structure ceramics.

6. The process of claim 4, wherein the composition of the ceramic platelets is selected from the group consisting of $TiO_2$, $B_4C$, AlOOH and clay.

7. The process of claim 4, wherein the composition of the ceramic fibers is selected from the group consisting of $Al_2O_3$, SiC, $Si_3N_4$, and $B_4C$.

8. The process of claim 1, wherein the ceramic material is alumina.

9. The process of claim 1, wherein the consolidated body of ceramic material prior to infiltration with the inorganic polymer has a density ranging from about 55 to about 85 volume percent.

10. The process of claim 4, wherein the green compact of ceramic material is formed by preparing an anqueous suspension of ceramic material, allowing the ceramic material to sediment out of the suspension, and drying the sedimented ceramic material.

11. The process of claim 10, wherein the consolidated body is infiltrated by placing the consolidated body in a solution of the inorganic polymer.

12. The process of claim 9, wherein the consolidated body of ceramic material after infiltration with the inorganic polymer has a density of at least 1 volume percent greater than the density of the green compact.

13. The process of claim 1, wherein M is selected from the group of inorganic ions consisting of aluminum, yttrium, silicon, copper, titanium, actinide and lanthanide ions.

14. The process of claim 13, wherein X is $O^{-2}$.

15. The process of claim 13, wherein M is aluminum ion.

16. The process of claim 1, wherein R and R' are selected from the group consisting of i-$C_3H_7O$—, n-$C_5H_{12}OO$—, and n-$C_{17}H_{35}OO$—.

17. The process of claim 1, wherein hydroxyl groups may be substituted for the pendent R and R' groups in an amount that does not adversely affect the solubility of the inorganic polymer in an organic solvent.

18. The process of claim 17, wherein the organic solvent is selected from the group consisting of tetrahydrofuran, dimethyl sulfoxide and chloroform.

19. The process of claim 13, wherein m ranges from about 10 to about 200.

20. The process of claim 8, wherein the infiltrated body of ceramic material is sintered in step (c) at a temperature ranging from about 1000° C. to about 1400° C.

21. The process of claim 5, wherein the infiltrated body of ceramic material is sintered in step (c) at a temperature ranging from about 1000° C. to abut 1900° C.

22. The process of claim 10, wherein the amount of ceramic powder, ceramic platelets, ceramic fibers or mixtures thereof comprising the aqueous suspension of ceramic material ranges from about 10 volume percent to about 60 volume percent.

23. The process of claim 1, wherein the consolidated body of ceramic material is infiltrated with an inorganic polymer solution comprising the inorganic polymer in an amount ranging from about 50 weight percent to about 70 weight percent and an organic solvent capable of maintaining the inorganic polymer in solution.

24. The process of claim 1, wherein the inorganic polymer is cross-linked by oxygen bridges between the inorganic ions, M, the oxygen bridges being represented by the formula:

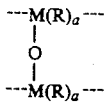

wherein M at each occurrence is the same or different trivalent or tetravalent inorganic ion; when M is trivalent, $a=1$; when M is tetravalent, $a=2$; and R at each separate occurrence may be an alkyl, alkoxy, acyloxy, phenyl or phenoxy group containing a chain of three or more carbon atoms, the number of oxygen bridges in the inorganic polymer may range up to about 75 percent.

25. A process for producing a sintered ceramic material comprising the steps of:
(a) forming a consolidated body of a ceramic material and a polyaluminoxane represented by the formula:

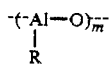

wherein R at each separate occurrence may be an alkyl, alkoxy, acyloxy, phenyl or phenoxy group containing a chain of at least 3 carbon atoms; and m may range from about 5 to about 1000; and
(b) sintering the infiltrated consolidated body of ceramic material.

26. The process of claim 8, wherein the infiltrated body of ceramic material is sintered at a temperature ranging from about 1200° C. to about 1300° C.

27. The process of claim 2, wherein the conditions effective in removing gases from the voids of the consolidated ceramic body comprise vacuum conditions.

28. The process of claim 27 wherein the consolidated body is infiltrated under a partial vacuum.

29. The process of claim 25, wherein the consolidated ceramic body is sintered at a temperature ranging from about 1200° C. to about 1300° C.

30. The process of claim 25, wherein R is selected from the group consisting of i-$C_3H_7O$—, n-$C_5H_{12}OO$—, and n-$C_{17}H_{35}OO$—.

31. The process of claim 12, wherein the consolidated body of ceramic material after infiltration with the inorganic polymer has a density that is at least about 55 volume percent.

32. The process of claim 25, wherein hydroxyl groups may be substituted for the pendant R group in an amount that does not adversely affect the solubility of the inorganic polymer in an organic solvent.

* * * * *

UNITED STATES PATENT AND TRADEMARK OFFICE
CERTIFICATE OF CORRECTION

PATENT NO. : 5,135,691

DATED : August 4, 1992

INVENTOR(S) : M. Hama et al.

It is certified that error appears in the above-identified patent and that said Letters Patent is hereby corrected as shown below:

| COLUMN | LINE | |
|---|---|---|
| 1 | 21 | "posses" should read --possess-- |
| 1 | 26 | "AS" should read --As-- |
| 1 | 51 | "decease" should read --decrease-- |
| 2 | 9 | "material." should read --materials-- |
| 2 | 12 | "represent" should read --represented-- |
| 2 | 24 | "bout" should read --about-- |
| 2 | 60, 61 | "mixture" should read --mixtures-- |
| 3 | 3 | "particle" should read --particles-- (second occurrence) |
| 3 | 17 | "agent" should read --agents-- |
| 3 | 58 | "convention" should read --conventional-- |
| 3 | 64 | "dispersnat" should read --dispersant-- |
| 4 | 13 | "bout" should read --about-- |
| 4 | 66 | "$O^{31}2$" should read --$O^{-2}$-- |
| 5 | 30 | "sue mixture" should read --use mixtures-- |
| 6 | 8 | after "under" insert --a-- |
| 6 | 19 | "absorbed" should read --adsorbed-- |
| 6 | 22 | "absorbed" should read --adsorbed-- |
| 6 | 26 | "1 hours." should read --1 hour.-- |
| 6 | 28 | "1 hours." should read --1 hour.-- |
| 6 | 59 | "1 hours" should read --1 hour-- |
| 7 | 14 | "oft he" should read --of the-- |
| 7 | 19 | "application." should read --applications.-- |
| 7 | 35 | "know" should read --known-- |

UNITED STATES PATENT AND TRADEMARK OFFICE
CERTIFICATE OF CORRECTION

PATENT NO. : 5,135,691

DATED : August 4, 1992

INVENTOR(S) : M. Hama et al.

It is certified that error appears in the above-identified patent and that said Letters Patent is hereby corrected as shown below:

| | | |
|---|---|---|
| 8 | 39 | "case" should read --cast-- |
| 8 | 42 | "tot he" should read --to the-- |
| 8 | 66 | "absorbed" should read --adsorbed-- |
| 8 | 67 | "1 hours" should read --1 hour-- |
| 9 | 30 | "form" should read --from-- |
| 10 | 17 | "anqueous" should read --aqueous-- |
| 12 | 9 | "ofthe" should read --of the-- |

Signed and Sealed this

Twenty-fifth Day of January, 1994

Attest:

BRUCE LEHMAN

Attesting Officer

Commissioner of Patents and Trademarks